Figure 1:
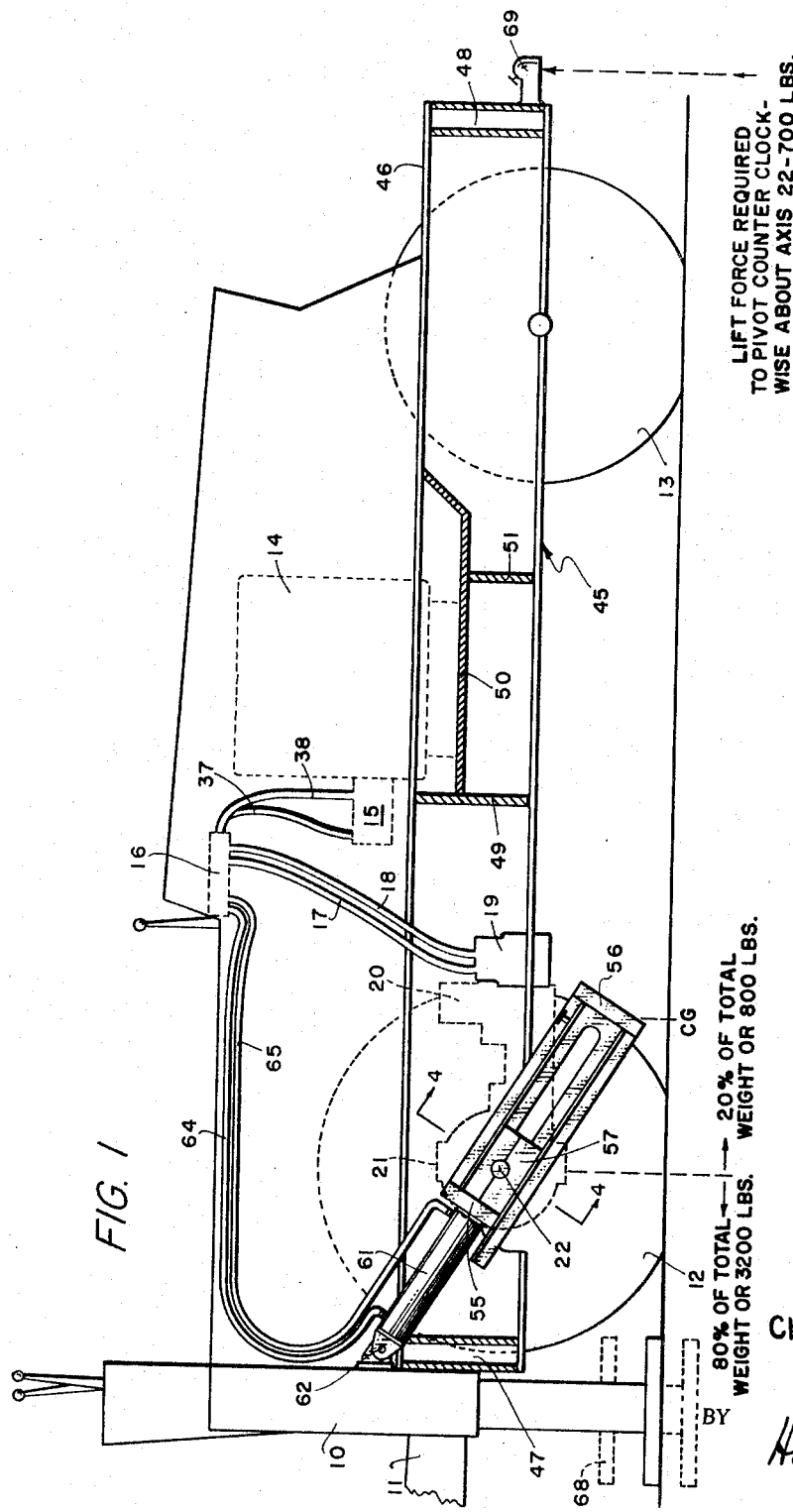

May 23, 1967 C. J. DAVIS 3,321,212
HEAVY SELF-PROPELLED WORK PERFORMING VEHICLE
Filed Aug. 23, 1965 3 Sheets-Sheet 1

FIG. I

CHARLES J. DAVIS
INVENTOR.
BY
Hubert Miller
ATTORNEY

May 23, 1967  C. J. DAVIS  3,321,212
HEAVY SELF-PROPELLED WORK PERFORMING VEHICLE
Filed Aug. 23, 1965  3 Sheets-Sheet 3
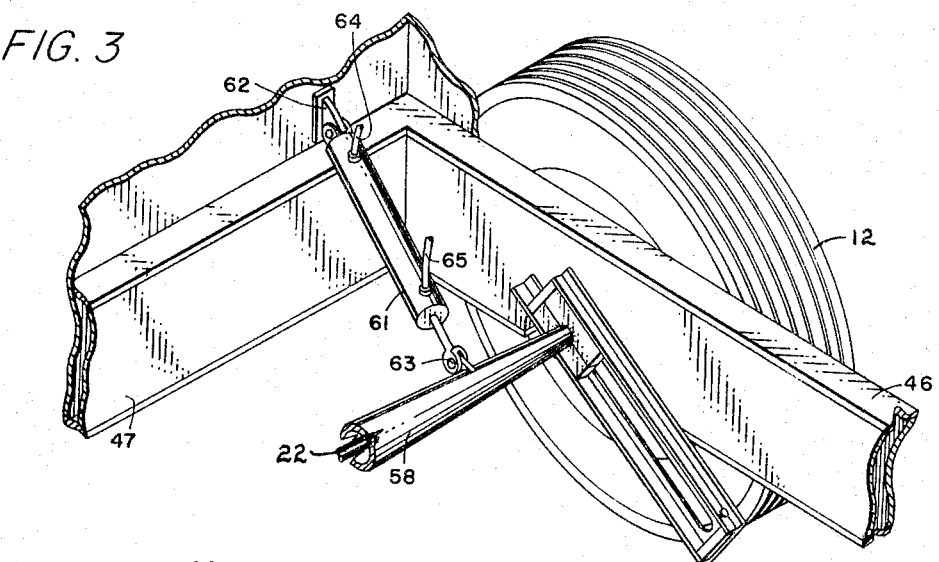
FIG. 3
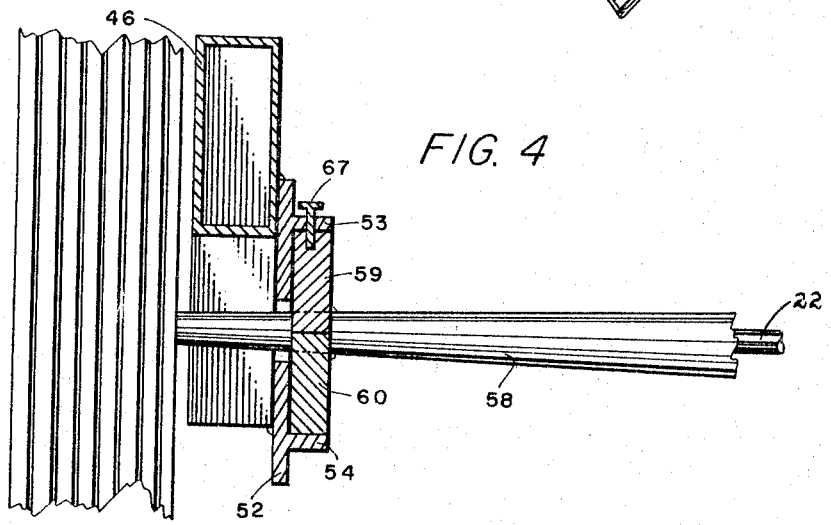
FIG. 4
FIG. 5
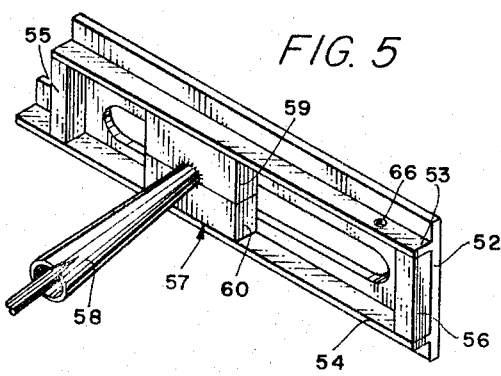
CHARLES J. DAVIS
INVENTOR.
BY *Hubert Miller*
ATTORNEY

United States Patent Office 3,321,212
Patented May 23, 1967

3,321,212
HEAVY SELF-PROPELLED WORK PERFORMING
VEHICLE
Charles J. Davis, 22 Colonial, Wichita, Kans. 67207
Filed Aug. 23, 1965, Ser. No. 481,603
6 Claims. (Cl. 280—43.23)

This invention relates generally to heavy work performing vehicles and more particularly to a wheel mounting structure for at least one pair of the supporting wheels of such a vehicle.

The problem of quickly transporting heavy work performing vehicles from one work site to a distant work site has long been recognized as very difficult of solution. Their road or highway speed under their own power is entirely too slow, and their ground clearance is very small. If an attempt is made to tow them on their own wheels at a higher speed, proper steering is almost impossible, particularly if one or the other end of the work vehicle is supported on steerable castering wheels. The provision of a transporting truck or trailer is expensive, and the loading of such a work vehicle onto such a truck or trailer requires several men plus extra equipment.

It is a primary object of this invention to provide a work vehicle construction which affords an increase in road clearance to facilitate the towing of the vehicle on a pair of its own supporting wheels; which allows the vehicle to be towed with its steerable wheels raised above the road or highway; which relieves the towing vehicle from having to support more than a very minute percentage of the total weight of the towed work vehicle, thus allowing a light pick-up truck or even a passenger car to be used for towing the work vehicle; and, last but not least, a construction which makes it possible for the operator of the work vehicle, unassisted, to lift the tow hitch end of the work vehicle and attach it to the towing vehicle for road transport.

All the above objects are accomplished by a novel wheel mounting assembly for one pair of non-steerable transport wheels located on opposite sides of the vehicle.

A wheel mounting assembly which embodies my invention constitutes a means for moving the common transverse wheel axis of the mentioned pair of transport wheels from a position near the adjacent end of the vehicle to a position immediately adjacent a transverse vertical plane which passes through the center of gravity of the vehicle, and for simultaneously raising the vehicle with respect to its supporting ground or road surface.

A new location for the fore and aft center of moments (the common transverse axis of the pair of wheels) is thus established, and the location of the newly established center of moments is such that the moment of the force acting forward of the transverse wheel axis substantially balances the moment of the force at the aft of the wheel axis. Consequently, it becomes an easy task for one man to lift the forward or steering end of the vehicle and attach it to a towing vehicle.

Figure 2:
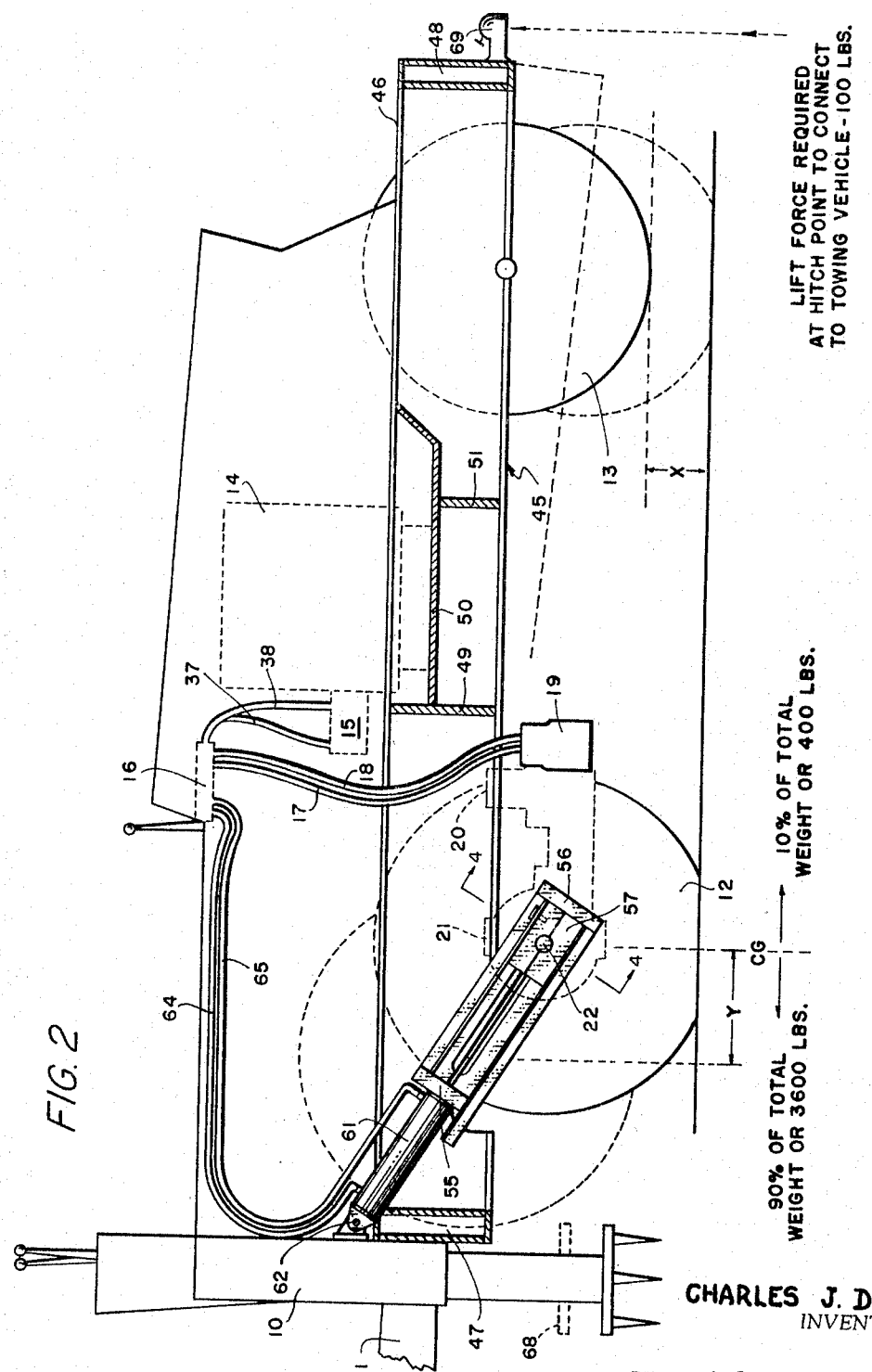

The invention will be more clearly understood when the following description is read in connection with the accompanying drawings, in which:

FIG. 1 is a schematic side elevational view of a self-propelled vehicle which carries a heavy mechanical shovel at the drive wheel end, the shovel being shown only fragmentarily, certain parts of the vehicle being removed, and some parts being shown in phantom and in section, the wheel mounting embodying my invention being shown with the drive wheels in a position for shovel operation, the drive wheel axis being spaced considerably from the vehicle center of gravity;

FIG. 2 is a view similar to FIG. 1, but shows the drive wheels in road transport or towing position, with the drive wheel axis immediately adjacent the center of gravity of the vehicle;

FIG. 3 is a fragmentary isometric view of a portion of the drive wheel end of the vehicle frame, and shows details of construction of the wheel mounting; and FIG. 4 is a transverse sectional view through the wheel and axle mounting at one side of the vehicle, and is taken in the plane indicated by the line 4—4 of FIG. 1; and FIG. 5 is an additional fragmentary isometric view showing details of construction of the wheel mounting.

The particular vehicle shown includes a pair of laterally spaced, conventional hydraulically operated stabilizer legs 10, which are rigidly secured to the working end of the vehicle frame 45, and to which is secured a heavy conventional mechanical shovel, indicated by the numeral 11, and shown only fragmentarily.

This particular vehicle is propelled by means of a hydrostatic drive which drives a pair of laterally spaced drive wheels 12. The opposite or towing end of the vehicle is supported by one or more steerable wheels 13. The invention is not in any way restricted, however, to a vehicle having any particular type of drive.

The hydrostatic drive shown includes an engine 14 which drives a hydraulic pump 15. Pump 15 supplies motive fluid to a hydraulic motor 19 through conduits 37 and 38, a control valve 16, and flexible conduits 17 and 18.

The housing of motor 19 is rigidly secured to the housing of a gear reducing transmission 20, which is in turn rigidly secured to a differential gear housing 21, which journals wheel axles 22. The motor 19, the transmission housing 20, the differential and axle housing 21, and the pair of drive wheels 12 will be hereinafter referred to as a wheel assembly or drive wheel assembly.

The vehicle frame 45 is of conventional welded construction and includes two elongated parallel side members, the visible one of which is identified by the numeral 46, two end members 47 and 48, and various intermediate cross frame members 49, 50 and 51. The end and side frame members are of box section, as shown in FIG. 3.

Near the shovel supporting end of the frame, on the inner surface of each of the side frame members 46, are welded a pair of identically positioned, downwardly sloping slide block guide tracks, the construction of which is more clearly shown in FIGS. 3, 4 and 5.

Each guide track includes a rigid flat plate 52 the upper half of which is welded flat to its respective side frame member 46, and from which a pair of parallel flanges 53 and 54 project inwardly. The spaces between the respective opposite ends of flanges 53 and 54 are closed by a pair of stop blocks 55 and 56, welded in the positions shown in FIG. 5.

Identically constructed and oriented composite slide blocks 57 are non-rotatably secured, as by welding, near the outer end of each of the two axle housings 58, which project rigidly from the differential housing 21. Each of the two slide blocks 57 is made up of a pair of elongated, complementally shaped rectangular section blocks 59 and 60, which are welded to each other and to the respective axle housings 58 along their mating edges, as shown in FIG. 5.

The transverse spacing of the two slide blocks 57 is only slightly less than the space between the inner surfaces of the flat plates 52 of the two guide tracks, and the overall width of the slide blocks is only slightly less than the distance between the inner surfaces of the respective parallel flanges 53 and 54 of each guide track. The slide blocks 57 are thus free to slide longitudinally in the guide tracks between the stops 55 and 56, and are maintained in their respective guide tracks by their fixed lateral spacing. In turn, the parallel flanges 53 and 54 of the respective guide tracks prevent rotation of the slide blocks 57, the axle housings 58, the differential housing 21, the transmission housing 20, and the motor 19, with respect to the vehicle frame 45, as this entire drive wheel assembly moves fore and aft in a sloping path with the slide blocks.

As a means of moving the entire drive wheel assembly along the sloping path determined by the identically oriented guide tracks, a pair of laterally spaced cylinder-piston type hydraulic motors 61 is provided. Each motor has one end pivotally connected to body structure, as at 62, and its opposite end pivotally connected to a respective one of the axle housings 58, as at 63. Fluid conduits 64 and 65 connect the opposite ends of each motor cylinder with the source of fluid under pressure (pump 15, FIG. 1), through the control valve 16. Control valve 16 is capable of actuating both motors simultaneously in the same direction and at the same rate of travel.

As a means of maintaining both slide blocks 57 at the lower end of their permitted paths of travel each of the upper guide track flanges 53 is provided with a pin aperture 66 (FIG. 5) which registers with a cooperating aperture in the upper surface of each slide block when the slide block contacts the lower stop 56. A pin 67 is inserted into the registering apertures to maintain the blocks at the lower ends of their strokes, thus eliminating any need to maintain continuous pressure in the fluid motor cylinders.

*Operation*

With the drive wheel assembly in the position shown in FIG. 1, the hydraulic stabilizer legs are lowered into firm ground contact, a portion of the total vehicle weight is thereby transferred to the stabilizer legs, and the vehicle is in shovel operating condition. In this condition approximately 80% of the total vehicle weight is distributed between the wheel axis 22 and the stabilizer legs 10, while 20% of the weight is distributed between wheel axis 22 and the steerable wheels 13.

After a particular ground working job has been completed and it is desired to tow the vehicle to a new location, the stabilizer legs 10 are elevated to the broken line position indicated by the numeral 68, and valve 16 is operated to actuate the fluid motors 61, extending the plunger rods to force the slide blocks 57 and the connected drive wheel assembly, including the wheels 12, to the relative position shown in FIG. 2. During this movement of the drive wheel assembly, the drive wheel axis 22 is moved to a position immediately adjacent a transverse vertical plane which passes through the center of gravity of the vehicle. Simultaneously the drive wheel axis is moved downward with respect to the vehicle frame, thus elevating the frame well above its normal shovel operating position. The primary object of this movement of the drive wheel assembly is, of course, to move the wheel axis 22 sufficiently near the center of gravity so that it will require a very small lifting force to raise the towing hitch end of the vehicle and attach the hitch to a towing vehicle. By varying the length of the guide tracks, and the relative locations of the lower stops 56, the drive wheel axis can be stopped at any desired location with respect to the center of gravity of the vehicle. In the example shown in FIG. 2 the wheel axis 22 has been moved sufficiently near the center of gravity of the vehicle to shift approximately 90% of the total weight of the vehicle to the shovel side of the axis 22, leaving only 10% of the total weight of the vehicle on the opposite side of that wheel axis. Due to the length of the moment arm between the new location of the wheel axis 22 and the tow hitch 69 at the opposite end of the vehicle, the force now required to lift the hitch end of the vehicle and attach it to a towing vehicle is only 100 lbs.

It will be noted that the hydraulic motor 19, the transmission 20, etc. all maintain their same relative horizontal positions during shifting of the drive wheel assembly from its FIG. 1 to its FIG. 2 position, and vice versa. It will also be understood that the motor 19 is capable of operating the drive wheels whether the drive wheel assembly is at the upper end of its permitted travel or at the lower end thereof.

Thus it is possible for a single operator to connect this vehicle to a towing vehicle, to transport the working vehicle to a desired point of work, to disconnect the working vehicle from the towing vehicle, to move the working vehicle to a desired point of use, and to lower the vehicle frame into its necessary working position.

The described arrangement also results in the towing vehicle having to support only a very small percentage of the total weight of the heavy work performing vehicle. From FIG. 2 it will be seen that when the heavy vehicle is in its towing position, the steerable wheels 13 are raised well above a ground contacting position, and cannot in any way interfere with the proper towing of the heavy vehicle on its drive wheels 12.

Having described the invention with sufficient clarity to enable those familiar with this art to construct and use it, I claim:

1. Mechanism for movably connecting a wheel and axle assembly to the rigid frame of a heavy work performing vehicle to afford selective movement of the transverse wheel axis between points near and remote from the vehicle center of gravity, said assembly including a rigid transverse axle housing, said mechanism comprising:
   a pair of elongated fore and aft disposed, oppositely positioned and identically oriented guide tracks, one rigidly secured to the vehicle frame at each of its sides and extending from a point adjacent a transverse vertical plane passing through the vehicle center of gravity to a remote point adjacent an end of the vehicle frame;
   a pair of slide blocks, one slidable in each of said guide tracks, and rigidly secured to the axle housing near the respective opposite ends thereof; and
   power means for selectively moving the wheel and axle assembly and the slide blocks in either direction along said guide tracks.

2. The mechanism described in claim 1 in which the guide tracks and the slide blocks cooperate to prevent relative rotational movement of the axle assembly about its own longitudinal axis.

3. The mechanism described in claim 1 in which the power means for moving the wheel and axle assembly comprises a pair of laterally spaced extensible power operated elements connected to the vehicle frame and to the axle assembly.

4. The mechanism described in claim 1, and travel limit stops for said slide blocks rigidly secured to the respective opposite ends of said guide tracks.

5. The mechanism described in claim 1 in which the corresponding ends of said tracks which are adjacent the vehicle center of gravity are located at a lower level with respect to the vehicle frame than the corresponding opposite ends thereof.

6. The mechanism described in claim 1, and
   means cooperating with the guide tracks and their respective slide blocks for releasably locking the slide blocks at corresponding ends of the tracks.

References Cited by the Examiner

UNITED STATES PATENTS

| | | | |
|---|---|---|---|
| 2,681,811 | 6/1954 | Green | 280—43.23 X |
| 2,878,731 | 3/1959 | Kressin | 280—43 X |
| 2,985,080 | 5/1961 | Harrison et al. | 280—43.23 X |

BENJAMIN HERSH, *Primary Examiner.*

C. C. PARSONS, *Assistant Examiner.*